United States Patent [19]
Bisbee et al.

[11] Patent Number: 5,615,268
[45] Date of Patent: Mar. 25, 1997

[54] SYSTEM AND METHOD FOR ELECTRONIC TRANSMISSION STORAGE AND RETRIEVAL OF AUTHENTICATED DOCUMENTS

[75] Inventors: Stephen F. Bisbee, Gibson Island; Douglas H. Trotter, Baltimore, both of Md.

[73] Assignee: Document Authentication Systems, Inc., Dallas, Tex.

[21] Appl. No.: 373,944

[22] Filed: Jan. 17, 1995

[51] Int. Cl.$^6$ ............................... H04L 9/00; H04L 9/30
[52] U.S. Cl. ............................... 380/25; 380/23; 380/30; 380/49
[58] Field of Search ............................... 380/3, 4, 23, 25, 380/30, 49, 50; 340/825.31, 825.34

[56] References Cited

U.S. PATENT DOCUMENTS

| | | | |
|---|---|---|---|
| 4,200,770 | 4/1980 | Hellman et al. | 380/30 |
| 4,405,829 | 9/1983 | Rivest et al. | 380/30 |
| 4,995,082 | 2/1991 | Schnorr | 380/23 |
| 5,136,646 | 8/1992 | Haber et al. | 380/49 |
| 5,136,647 | 8/1992 | Haber et al. | 380/49 |
| 5,214,703 | 5/1993 | Massey et al. | 380/37 |
| 5,231,668 | 7/1993 | Kravitz | 380/28 |
| 5,276,737 | 1/1994 | Micali | 380/30 |
| 5,315,658 | 5/1994 | Micali | 380/30 |
| 5,323,146 | 6/1994 | Glaschick | 340/825.34 |
| 5,339,361 | 8/1994 | Schwalm et al. | 380/23 |
| 5,363,448 | 11/1994 | Koopman, Jr. et al. | 380/23 |
| 5,377,270 | 12/1994 | Koopman, Jr. et al. | 380/25 |

OTHER PUBLICATIONS

G. F. Hice et al., *DMS Prologue to the Government F–Mail Revolution*, J.G. Van Dyke & Associates, Inc., chapt. 3 (1995).

D. Chaum, "Achieving Electronic Privacy", *Scientific American*, vol. 247, No. 8, pp. 96–101 (Aug. 1992).

W. Diffie et al., "Privacy and Authentication: An Introduction to Cryptography", *Proc. IEEE* vol. 67, pp. 397–427 (Mar. 1979).

W. Diffie, "The First Ten Years of Public–Key Cryptography", *Proceedings of the IEEE,* vol. 76, pp. 560–577 (May 1988).

M.E. Hellman, "The Mathematics of Public–Key Cryptography", *Scientific American,* vol. 234, No. 8, pp. 146–152, 154–157 (Aug. 1979).

C.R. Merrill, "Cryptography for Commerce–Beyond Clipper", *The Data Law Report,* vol. 2, No. 2, pp. 1, 4–11 (Sep. 1994).

(List continued on next page.)

*Primary Examiner*—Bernarr E. Gregory
*Attorney, Agent, or Firm*—Burns, Doane, Swecker, & Mathis, L.L.P.

[57] ABSTRACT

A system and method is provided that implements digital encryption for the electronic transmission, storage and retrieval of authenticated documents and that enables the establishment of the identity of the originator of an electronic document and of the integrity of the information contained in such a document. Together these provide irrevocable proof of authenticity of the document. The system and method make it possible to provide "paper-less" commercial transactions, such as real-estate transactions and the financial transactions secured by real estate. A Certification Authority provides tools for initializing and managing the cryptographic material required to sign and seal electronic documents. An Authentication Center provides "third party" verification that a document is that executed and transmitted by the document's originator. The Certification Authority and the Authentication Center together provide for third-party assumption of the risk of the authenticity of documents, an audit trail of the documents, and storage and retrieval of the documents by authorized parties. The system and method eliminates the need for "hard copies" of original documents as well as hard-copy storage. Retrieval of an authenticated document from the Authentication Center may be done by any number of authorized parties at any time by on-line capability.

6 Claims, 7 Drawing Sheets

OTHER PUBLICATIONS

L. Nadile, "Service Notarizes Electronic Documents", *PC Week*, pp. 29, 36 (Jan. 16, 1995).

R.L. Rivest et al., "A Method for Obtaining Digital Signatures and Public–Key Cryptosystems," *Communications of the ACM,* vol. 21, pp. 120–126 (Feb. 1978).

C.E. Shannon, "Communication Theory of Secrecy Systems", *Bell Sys. Tech. J.* vol. 28, pp. 656–715 (Oct. 1949).

FIG. 1

TRANSACTION AUTHORIZATION AND PROTECTION OVERVIEW

System Component and Function

| PCM/CIA Card | Terminal/Device Software | DAS Hardware & Software |
|---|---|---|
| Provides cryptographic processing for: | Formats data/sends it to card for: | Provides cryptographic processing for: |
| Digital signatures (non-repudiation* integrity protection) PIN encryption/decryption (Public Key) Public Key Management of DES keys. Stores: User authorization limits/ allowed functions profile Public and Secret keys & certificate | Digital Signatures PIN encryption/decryption (Public Key) Public Key management of DES keys Crypto board provides processing for: Digital signatures (non-repudiation/integrity protection) Public Key Management of DES keys | Certificate/signature validation PIN validation DES encryption for confidentiality protection Public key Management of DES keys. Storage of audit trail and liability allocation |

*A signature that cannot be repudiated is used to allocate liability on an absolute basis for each step in the preparation, transmission and execution of a transaction.

FIG. 2

DAS ARCHITECTURE

MPC — Multiport Controller
PCR — PCM/CIA Card Reader
* — 486/50 Laptop Computers may be utilized

DAS CONTROL FUNCTIONS

| CONTROL FUNCTIONS | | | |
|---|---|---|---|
| Confidentiality | Integrity | Non-repudiation (Signature) | Management Limits on User |
| | | User | Authentication System | |
| Public key encryption of PIN and Keying Material | Digital Signature provides integrity protection | Digital sign. of user/ customer "signs" the transactions in a manner that cannot be repudiated. | Digital Sign. of AC "signs" the transactions in a manner that cannot be repudiated. | Limits for user profile stored on PCM/ CIA card |
| DES encryption of transactions | | | Integrity Block | |
| | | | Date and Time stamp | PIN and PCM/ CIA card authentication to terminal and DAS system |

FIG. 5

DOCUMENT AUTHENTICATION SYSTEM
LOAN TRANSACTION

Chart Steps

Step 1. Complete Certification Authority code generation and card issuing to parties transferring the documents establishing legal evidence trail. Equip parties to transmit and receive documents Step 2. Bank/Mortgage Co. loads and electronically transmits documents to Authentication Center which forwards to Title Co./Closing Agent Step 3. Authentication Center transmits documents to Title Co./Closing Agent Step 4. Title Co./Closing Agent has documents executed by digital signature by Homebuyer/Homeowner Step 5. Title Co./Closing Agent provides Homeowner/Homebuyer with "Hard Copy" of signed documents Step 6. Title Co./Closing Agent transmits documents to Authentication Center which dates and time stamps the executed documents and forwards documents to Bank/Mortgage Co.

Whenever Bank/Mortgage Co. needs authentic documents, can retrieve on-line from Authentication Center storage Step 7. Bank/Mortgage Co. directs authentic documents to be transferred by Authentication Authority to secondary market investor.

Step 8. Whenever investor needs authentic documents, can retrieve on-line from Authentication Center

FIG. 6b

SYSTEM AND METHOD FOR ELECTRONIC TRANSMISSION STORAGE AND RETRIEVAL OF AUTHENTICATED DOCUMENTS

BACKGROUND

Applicant's invention relates to systems and methods for providing a verifiable chain of evidence and security for the transfer and retrieval of documents in digital formats.

Paper documents are the traditional evidence of the communications and agreements between parties in commercial and other transactions. Financial and real-estate transactions are protected by paper-based controls. Signatures and safety paper (such as pre-printed checks) facilitate detection of unauthorized alterations of the information of commercial transactions. Important documents may also be provided with "third man" controls, by the witnessing of signatures and by the seal and acknowledgement of a Notary Public.

The methods of commerce, however, have changed dramatically and continue to evolve. This is most evident in the replacement of paper-based communications with electronic communications. The "due care" controls used with paper-based communications do not exist in routine electronic transactions. Standard electronic communication does not provide the same ability to protect the authenticity and integrity of the communicated information.

When communication is by electronically reproduced messages such as e-mail, facsimile machine, imaging, electronic data interchange or electronic fund transfer, there no longer exists a signature or seal to authenticate the identity of the communicator. The traditional legally accepted methods of verifying the identity of a document's originator, such as physical presence or appearance, an ink signature, personal witness or Notary Public acknowledgement, are not possible.

The continued evolution of computer and telecommunications technology has regretfully been accompanied by the invention of more and more sophisticated ways to intercept and alter information electronically transmitted, including the widespread phenomenon of remote intrusion of computer systems through telecommunication links.

Some approaches to providing secure electronic commerce technology by data encryption give the user a verification mechanism for the integrity or privacy of the transmission that is controlled by the user and does not include the element of non-repudiation. At present, no distributed electronic document authentication system exists that can authenticate written or printed instruments in a manner that cannot be repudiated. No system provides electronic document verification based on a digital signature that cannot be repudiated, although some attempts have been described. See. e.g., D. Chaum, "Achieving Electronic Privacy", *Scientific American*, vol. 247, no. 8, pp. 96–101 (August 1992); C. R. Merrill, "Cryptography for Commerce—Beyond Clipper", *The Data Law Report*, vol. 2, no. 2, pp. 1, 4–11 (September 1994).

In contrast, Applicant's document authentication system (DAS) provides the needed security and protection of electronic transmissions. Most important to commercial and financial institutions, Applicant's DAS assumes the risk and responsibility of a document's authenticity. Applicant's DAS utilizes an asymmetric cryptosystem, known as a public-key system, to help ensure that the party originating an encrypted document is electronically identifiable as such.

Various aspects of public-key cryptographic (PKC) systems are described in the literature, including R. L. Rivest et al., "A Method for Obtaining Digital Signatures and Public-Key Cryptosystems," *Communications of the ACM*, vol. 21, pp. 120–126 (Febuary 1978): M. E. Hellman, "The Mathematics of Public-Key Cryptography", *Scientific American*, vol. 234, no. 8, pp. 146–152, 154–157 (August 1979); and W. Diffie, "The First Ten Years of Public-Key Cryptography", *Proceedings of the IEEE*, vol. 76, pp. 560–577 (May 1988). Popular PKC systems make use of the fact that finding large prime numbers is computationally easy but factoring the products of two large prime numbers is computationally difficult. A PKC system uses a key for decryption that is different from the key for encryption. Thus, a PKC user's encryption key can be public for use by others, and the difficulty of securely distributing keys may be avoided.

In general, information to be communicated just needs to be encrypted according to some system that the users have agreed in advance to use. Besides the PKC method, another encryption method is the data encryption standard (DES), which, as explained in W. Diffie et al., "Privacy and Authentication: An Introduction to Cryptography", Proc. IEEE vol. 67, pp. 397–427 (March 1979), is a classical cryptographic system. In general, a classical cryptographic system is a set of instructions, a piece of hardware, or a computer program that can convert plaintext (the unencrypted information) to ciphertext, or vice versa, in a variety of ways, one of which is selected by a specific key that is known to the users but is kept secret from others.

For either a classical or PKC system, the security of a message is dependent to a great extent on the length of the key, as described in C. E. Shannon, "Communication Theory of Secrecy Systems", *Bell Sys. Tech. J.* vol. 28, pp. 656–715 (October 1949).

SUMMARY

These and other objects and advantages are provided by the DAS which comprises the means to identify the originator of the electronic document, to provide irrevocable proof of the integrity of the transmission of an electronic document and the means to prevent the originator of the document from denying the document's originator, i.e., non-repudiation.

In one aspect of Applicant's invention, an authentication system for the electronic transmission of documents comprises a device for digitally encrypting a document; a device for certifying the identity of the document transferor; a device for generating a public key and a private key; a device for signing the document with a digital signature; a device for verifiably transmitting the electronic document; and a device for authenticating a transmitted encrypted signed electronic document; whereby the system ensures the integrity of the transmitted document and the non-repudiation of the transmitted document by the document transferor.

In another aspect of the invention, an electronic document storage and retrieval system comprises a device for securely storing digitally encrypted electronic documents; a device for authenticating electronic documents retrieved from storage; and a device for verifying the authority of the party requesting the authenticated electronic document; whereby the system ensures the authenticity of the electronic document stored within the system and the transfer of the electronic document to authorized parties.

In another aspect of the invention, a method of authenticating electronically transmitted documents comprises the steps of digitally encrypting a document; certifying the identity of the document transferor; generating a public key and a private key; signing the document with a digital signature; verifiably transmitting the electronic document; and authenticating a transmitted encrypted signed electronic document; whereby the integrity of the transmitted document and the non-repudiation of the transmitted document by the document transferor is ensured.

BRIEF DESCRIPTION OF THE DRAWINGS

The various features and advantages of Applicant's invention will become apparent by reading this description in conjunction with the drawings in which.

DETAILED DESCRIPTION

Applicant's invention can be implemented utilizing commercially available computer systems and technology to create an integrated closed system for authentication of electronic documents.

Figure 1:
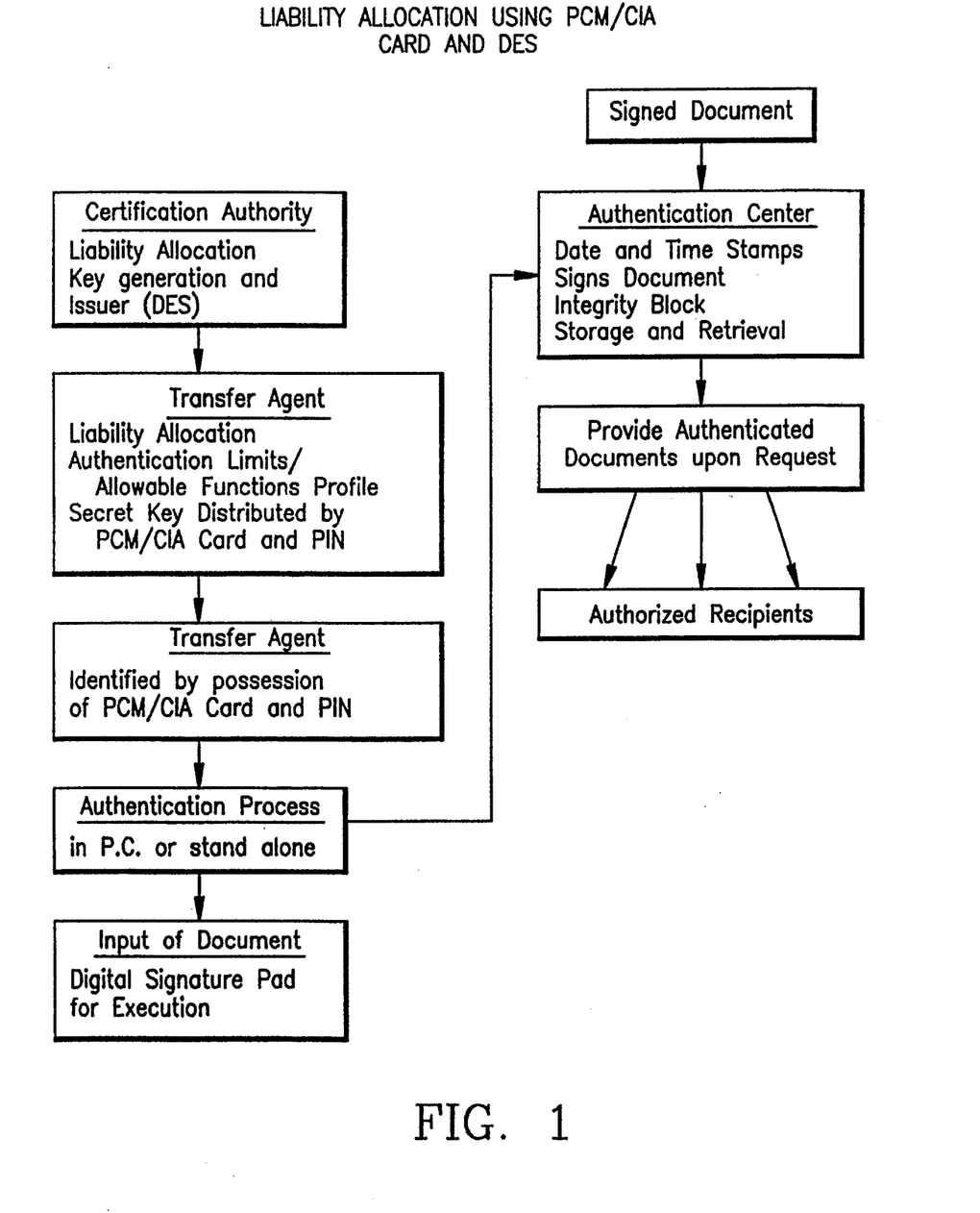
FIG. 1 is a block diagram of the liability allocation for authentication in the DAS.

Referring to FIG. 1, which is a block diagram of the liability allocation for authentication in Applicant's DAS, the DAS uses a Certification Authority framework by which a public/private key that is utilized to encrypt a document is delivered to the document's originator by an established, auditable means. Certification flameworks are described in the above-cited publication by C. R. Merrill, which is expressly incorporated here by reference. As described below, the public/private key is advantageously delivered in the form of a PCM/CIA card for insertion in the originator's computer. For example, the bonded courier services commonly used to ferry securities between parties could be used to deliver the card to the document originator.

In an additional aspect of Applicant's invention, the public/private key is only effective when it is used in conjunction with a personal identification number (PIN) that is assigned to the originator of the encrypted document by the Certification Authority and that may be delivered with the originator's key. Any subsequent transmitter of the encrypted document would similarly be provided with a certified public/private key and a PIN for use in transmission of the encrypted document.

In FIG. 1, a document's originator and any subsequent transminer are called a Transfer Agent, and it will be appreciated that a Transfer Agent is identified to the DAS by its possession of a valid public/private key and a valid PIN. In issuing the key and PIN to the Transfer Agent, the DAS advantageously records one or more characteristics of the Transfer Agent in association with the key and PIN. For example, the Transfer Agent may be authorized to conduct only certain types of transactions and/or transactions having less than a predetermined value.

Issuance by the Certification Authority of the public/private keys permits a digitally signed certificate ensuring the identity of each transminer of an encrypted document. The Certification Authority also retains the ability to revoke a public/private key, or to reissue a public/private key, from a remote location electronically. The Certification Authority can also provide privilege management in accordance with the policy set for the system. For example, the Certification Authority can set financial or other limits on the authority granted to the Transfer Agent based upon restrictions inserted into the certificates, such as the characteristics described above. In this way, the DAS assumes responsibility for the Certification Authority and verification of the identity of the Transfer Agent (document originator or transmitter).

In an important aspect of Applicant's invention, the DAS is a system for authenticating a document by applying digital signature encryption technology for the electronic transmission of the document. As used here, "authentication" is the corroboration and verification of the identity of the party which executed, sealed, or transmitted the original document and verification that the encrypted document received is the document sent by that party. The DAS uses an Authentication Center to provide an audit or evidence trail from the original execution and encryption of the executed or sealed document through all subsequent transmissions of the encrypted document.

The Certification Authority and Authentication Center would use a physically secure facility that is a "trusted center" having protection against electromagnetic interference, power source filters, twenty-four-hour security, and "vaulted" construction. In view of its importance, a facility alarm system would advantageously include two-person controls, with no single person having access to key generating or key management systems. All personnel connected with the operations of cryptographic key management and transmission of electronic documents would have their trustworthiness evaluated in the surest ways possible, e.g., personal interviews, background checks, polygraphs, etc. Moreover, the Certification Authority would preferably use a "red/black" system by which key generation would be carried out by two separate teams, the members of each of which do not have access to the other team's information. In this way, one individual would be prevented from obtaining complete access to key generation and to key management.

Another aspect of Applicant's DAS authentication that is in contrast to prior systems is the utilization of an integrity block and a date and time "stamp" on each transmitted document. Suitable time and date stamps are those provided by systems described in U.S. Pat. Nos. 5,136,646 and 5,136,647 to Smart A. Haber and W. S. Stornetta, Jr., both of which are expressly incorporated here by reference, and commercially available from Surety Technologies, Inc. The integrity block and the date and time stamp, which are applied by the Authentication Center, eliminate the possibility of unauthorized alteration or tampering with a document subsequent to its original execution or sealing. The integrity block for a document received from a Transfer Agent is generated by the Authentication Center using any of several known digital signing algorithms. The integrity block ensures that the document cannot be altered without detection. In addition, use of the digital signing algorithm can advantageously provide for non-repudiation, i.e., the ability to prove the identity of the document's originator. In this way, the integrity block and date and time stamp provide notice and evidence of any alteration efforts, even by a document's originator if alteration is attempted after origination.

In accordance with Applicant's invention, each transaction and its documents are authenticated by transmission to the Authentication Center from the Transfer Agent's personal computer or stand-alone terminal. As described below, the Transfer Agent provides the document in digital form, such as the output of a conventional word processor, to the Transfer Agent's PCM/CIA card. As an option, a device for digitizing a hand-written signature may also be provided and the digital signature may be added to the digital document. The digital document is encrypted by the DAS PCM/CIA card, and the encrypted version is communicated to the Authentication Center electronically, e.g., using a modem. Other ways of communicating the encrypted documents might be used (for example, dispatching a diskette containing the document), but the great advantage of electronic communication is speed.

The Authentication Center verifies the identity of the Transfer Agent and the authenticity of the documents, and includes an integrity block and a date and time stamp in the encrypted documents electronically, thereby establishing each transaction in a manner which can not be repudiated. The combination of these functions, in conjunction with a protected audit trail, can be used at a future date to prove conclusively that a party initiated or received a transaction. In particular, Applicant's invention provides for authentication of a document in a way that prohibits an originator from denying that the document originated with that originator, and provides irrevocable proof of authenticity.

The authenticated, encrypted documents are stored by the third-party Authentication Center in any convenient form, such as on optical and/or magnetic disks. Once a transaction is completed and the encrypted document or documents are transmitted and authenticated by the Authentication Center, any authorized party can access the Authentication Center through an electronic device such as modem to obtain or further transmit an authenticated document. All transmissions of electronic documents from the originator are made to the Authentication Center which, provides authentication as described above, and stores the authenticated documents for transmission to and on behalf of authorized parties whose identities and instructions are similarly authenticated by the Authentication Center.

In accordance with Applicant's invention, the DAS verifies and ensures that documents that have been transmitted, stored, or retrieved have not been accidentally or intentionally modified. The DAS can verify at any stage and at any time that a document is exactly, to the last digital pixel, the document which was executed and transmitted by the originator and that the document has not been altered or impaired in any manner. This element of integrity combined with a digital signature and a date and time stamp enable the DAS to ensure that a document is not a fabrication, forgery, or impersonation of the document originally executed or sealed by the document's originator.

Since originators of documents to be encrypted, such as loan and mortgage documents, commercial paper and other securities, property deeds and leases, etc., should be able to execute their transactions from a variety of locations, the DAS moves the heart of the cryptographic process to a PCM/CIA cryptographic card entrusted to a respective authorized Transfer Agent. This permits individual utilization of any computer in any location that is networked or connected with the Authentication Center. As described above, the cryptographic cards are issued and monitored by the Certification Authority.

Figure 2:
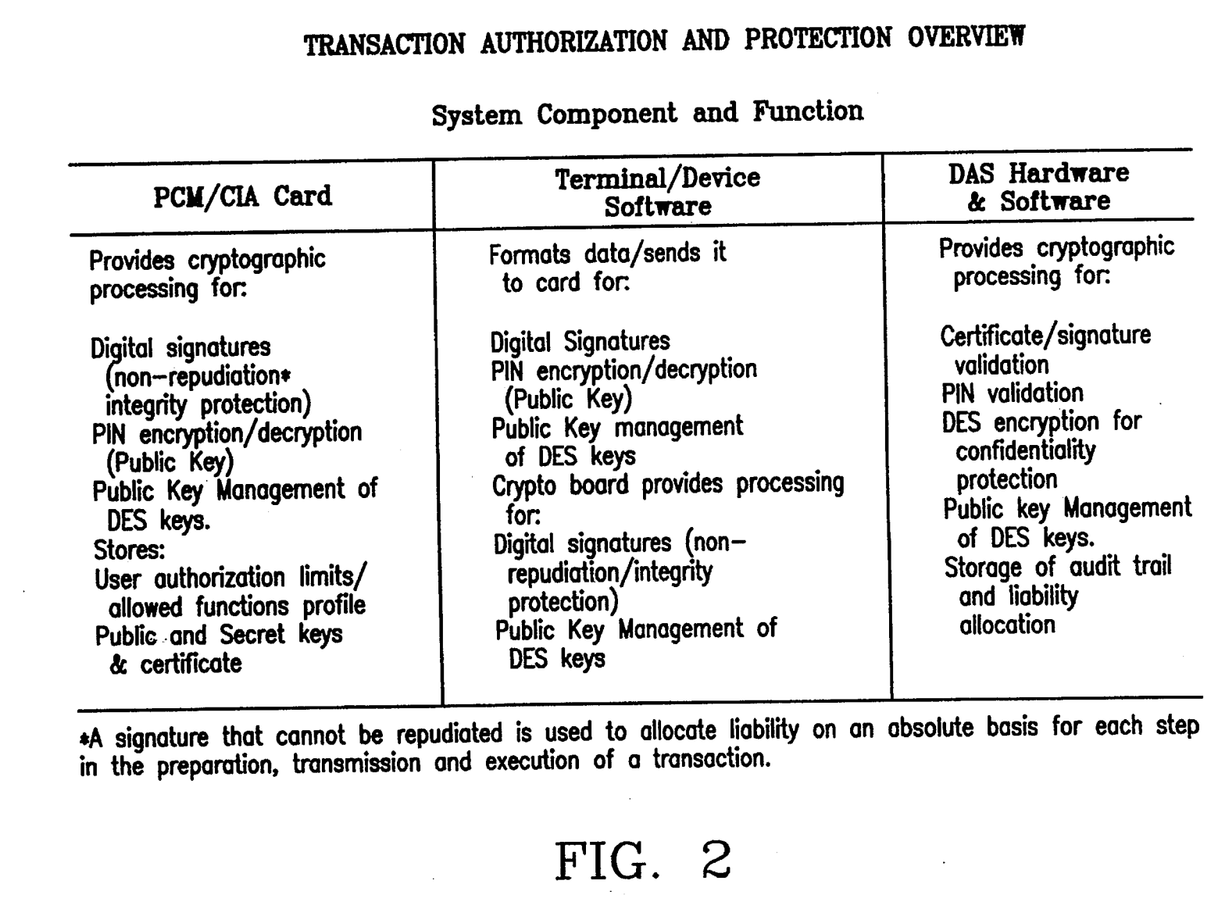
FIG. 2 summarizes the functions of the DAS relating to document transmission authorization and protection.
Figure 3:
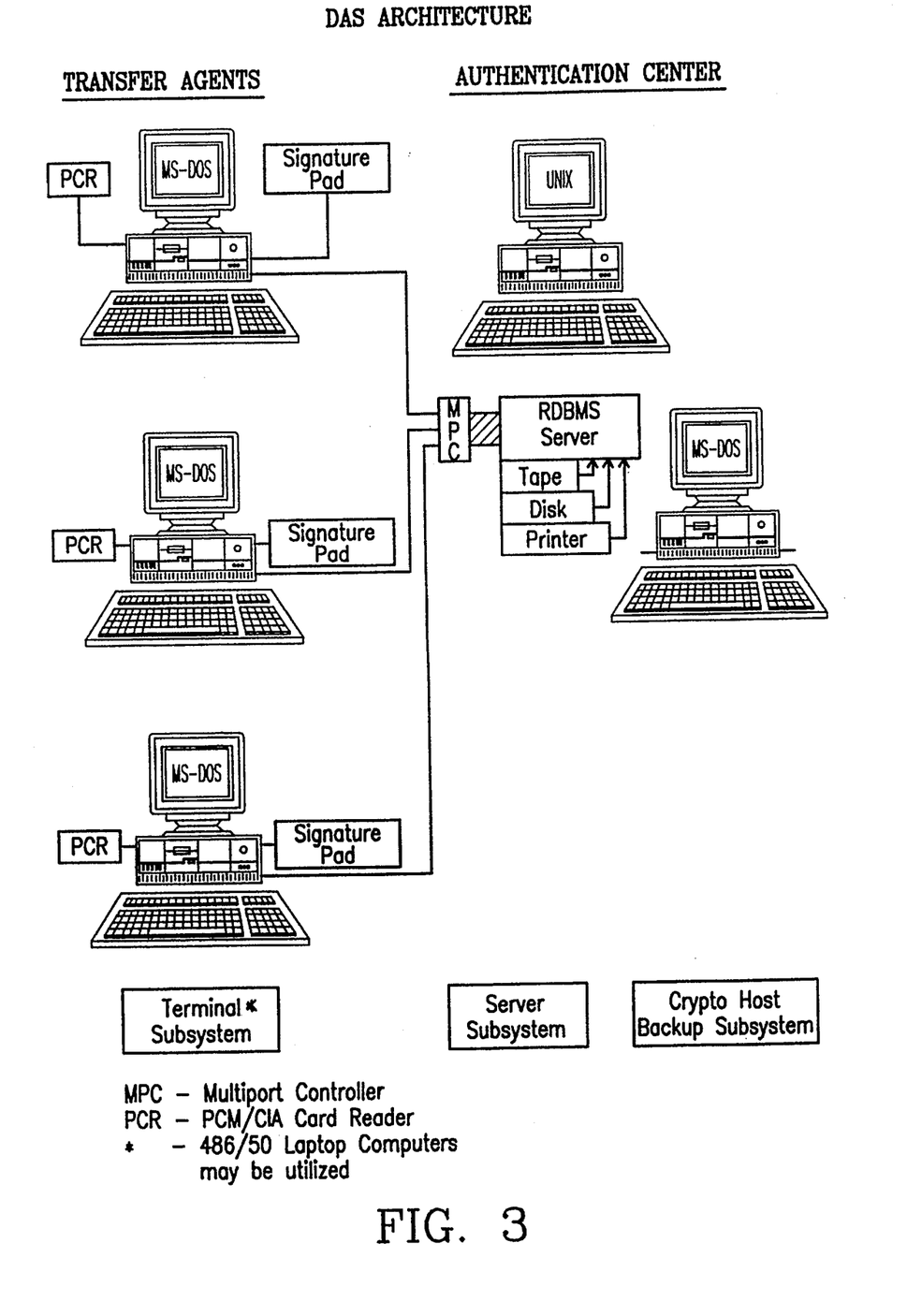
FIG. 3 is a simple diagram of the DAS architecture.
Figure 4:
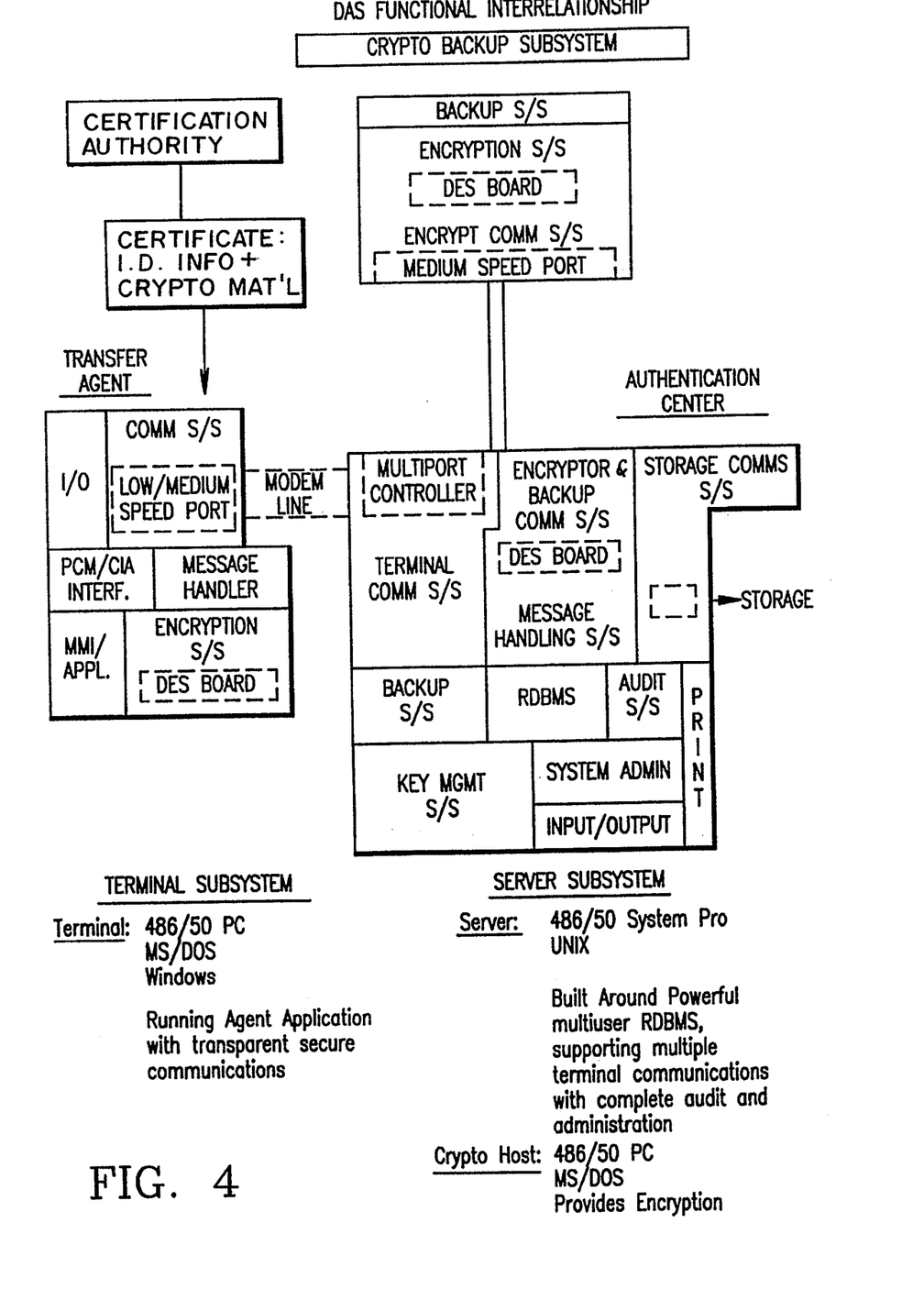
FIG. 4 is a block diagram of the functional interrelationship among a Transfer Agent, the Certification Authority, and an Authentication Center.

FIG. 2 summarizes the functions of the DAS relating to document transmission authorization and protection. In the left column are the functions of a Transfer Agent's PCM/CIA card; in the center column are other functions carried out by the Transfer Agent's transmission device; and in the right column are functions of the Authentication Center. FIG. 3 is a diagram illustrating interconnections among three Transfer Agent terminals and a server subsystem and backup subsystem in the Authentication Center in the DAS architecture. FIG. 4 is a block diagram of the functional interrelationship among a Transfer Agent, the Certification Authority, and the Authentication Center.

The cryptographic card includes components, such as a microprocessor and electronic memory devices, for carrying out the steps of a PKC algorithm as well as a DES algorithm. Also, the card should be tamper-proof, which can be assured by designing it to destruct upon any attempted alteration. The National Institute of Standards and Technology has certified the authentication implementation of the cryptographic card suppliers that may be used by the DAS.

In accordance with Applicant's invention, each transaction and its documents are authenticated using a cryptographic key stored on the cryptographic card and known only to the third-party Certification Authority/Authentication Center. DES and PKC encryption devices and software are commercially available from a number of sources, including RSA Data Security, Inc.; Public Key Partners; Surety Technologies, Inc.; and Ascom Tech AG, Switzerland. This authentication process links the individual Transfer Agent to each transaction in a manner that cannot be repudiated.

A second key known only to the Certification Authority/Authentication Center is stored in the cryptographic card and used to sign the transaction in a manner that cannot be repudiated. The combination of these two signature functions (in conjunction with the physically protected audit trail) can be used at a future date to prove conclusively that the agent, employee or firm (the Transfer Agent) initiated or received a transaction. In addition, a Notary Public support function is available for implementation.

Employee or agent sign-on at the Transfer Agent's terminal is protected by the PIN and the cryptographic features of the cryptographic card held by that Transfer Agent. The combination of these controls uniquely identifies the agent or employee to the DAS in a manner that cannot be repudiated. In addition, agent or employee authorization and transaction entry privilege information may be stored in the cryptographic card in secure form as described above. The DAS uses this information in conjunction with the PIN to set privilege, access, volume and fund amount limits.

Figure 5:
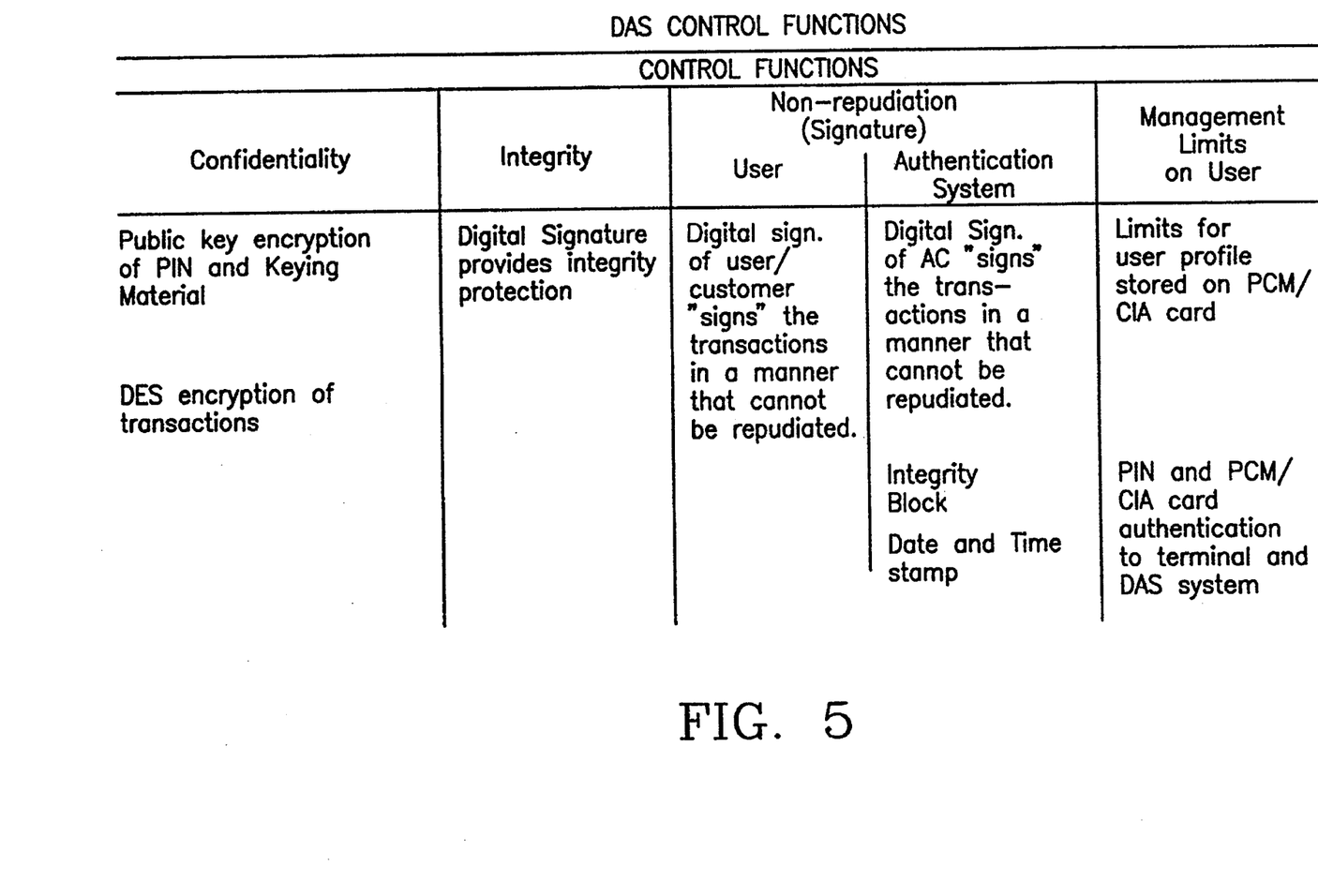
FIG. 5 is a block diagram of DAS control functions.

The DAS provides a distributed validation capability using a "signature" that cannot be repudiated. The strategy uses PKC to reduce the key management overhead and to provide a digital signature that cannot be repudiated for all documents and transactions. Encryption is used to provide confidentiality protection of the PIN and other transaction details as described above. These control functions of the DAS are summarized in FIG. 5.

Additionally, the DAS can use a communications and security server for a variety of applications in the commercial and financial services industry (e.g., retail and wholesale banking, securities processing, transaction support, brokerage multiple list, direct or agent real estate settlements, contract execution, point-of-sale). The DAS preferably utilizes modem database tools, and thus the server can advantageously utilize relational technology with a SQL interface (e.g., SYBASE). Also, the server is advantageously usable with networks such as local area networks (LANs), wide area networks (WANs) and direct modem connections to PC- and Macintosh-architecture computers.

The DAS utilizes a variety of technology based tools that may be outlined as follows. The security architecture allocates liability on a basis that cannot be repudiated by using approved industry standards. In particular ANSI X9.9 and X9.19, which are incorporated here by reference, are used for authentication. The DES is used for encryption of the documents, and triple encryption is used to protect key encrypting. The session key management option of ANSI X9.24, Financial Institution Retail Key Management, which is incorporated here by reference, is used in conformance with the security architecture. Also, PKC technology is implemented.

Advantageously, the DAS uses primarily commercially available, off-the-shelf hardware and software, and emphasizes an open-system architecture where technically feasible. The DAS incorporates cryptographic card technology for user identification, and performs authentication for any document. As described above, the DAS captures document transaction information in a database.

In one aspect of Applicant's invention, documents, transactions and other information are protected by using ANSI standard cryptographic techniques. PINs are encrypted using DES; selected message elements are authenticated using the methods defined in ANSI X9.9, Financial Institution Message Authentication (Wholesale); and cryptographic key management conforms to ANSI X9.17, Financial Institution Key Management (Wholesale), which is incorporated here by reference. The technology specified in these standards protect the integrity of transactions against fraud and manipulation.

As illustrated in FIG. 4, the originator of an electronic document or other Transfer Agent may implement the DAS with a typical 486/50 desktop or laptop computer having the DAS encryption subsystem (PCM/CIA card) installed and optionally an electronic digital signature pad for hand-signed "execution" of the document. As explained above, the Certification Authority issues a certificate including the public/private cryptographic keys and identification information to the Transfer Agent. It is not required for the function of the DAS to have a hand-signed instrument since a digital signature on the document is sufficient. However, at this time, a typical party in loan or other commercial transactions requires the comfort of receiving laser-printed copies of documents which have been executed by hand. Other components and software typically provided in the Transfer Agent terminal are a communication subsystem for handling transmission of encrypted documents to the Authentication Center by a modem telephone line or other suitable communication link, a PCM/CIA card interface, a message handler, input/output interface, and multimessage input application.

The Authentication Center is advantageously organized as a server subsystem, a crypro backup subsystem, and storage. As part of the server subsystem, which may be implemented with a 486/50 computer running under a UNIX-type operating system, a terminal communication subsystem includes a multiport controller (see also FIG. 3) handles communications with the Transfer Agent terminals. Also provided in the server subsystem are a cryptographic key management subsystem, a backup subsystem, a relational database management system, I/O, system administration, and audit subsystem. An encryptor and backup communication subsystem interfaces with the backup subsystem mentioned above that may be implemented as a 486/50 computer running under an DOS-type operating system. A storage communication subsystem interfaces with the document storage device or devices mentioned above.

The DAS also would permit a "Notary Public" type of secondary support function. This would permit a third party present at the document's execution to also have a cryptographic card which would "seal" the transaction for further verification that the parties executing or sealing the document to be encrypted were in fact the proper parties. This additional notary function is not required, but would assist in the further authentication of the identities of the parties.

Figure 6A:
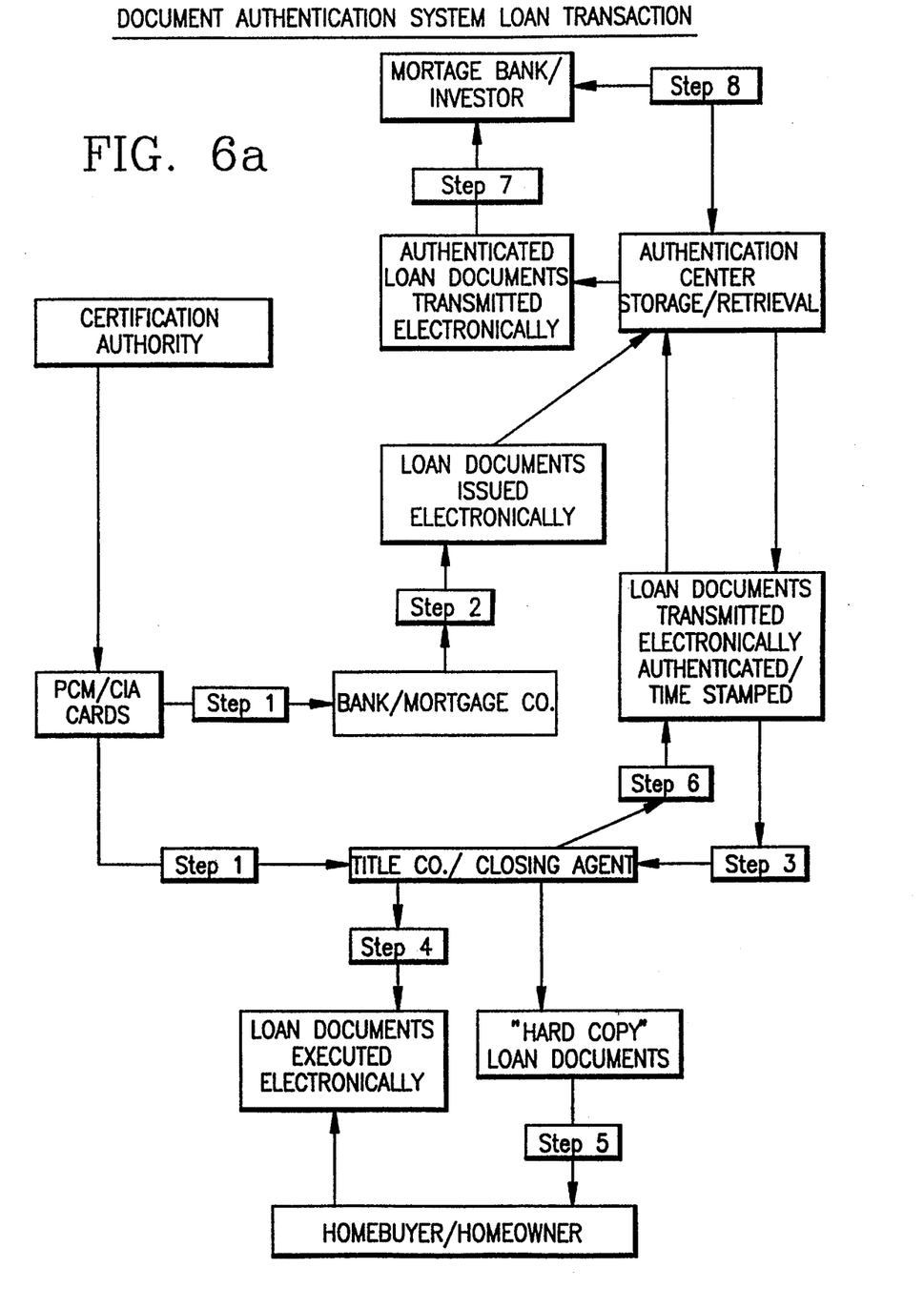
FIGS. 6a, 6b are diagrams illustrating application of the DAS in the mortgage finance industry with the title company/closing agent for the loan as a Transfer Agent.
Figure 6B:
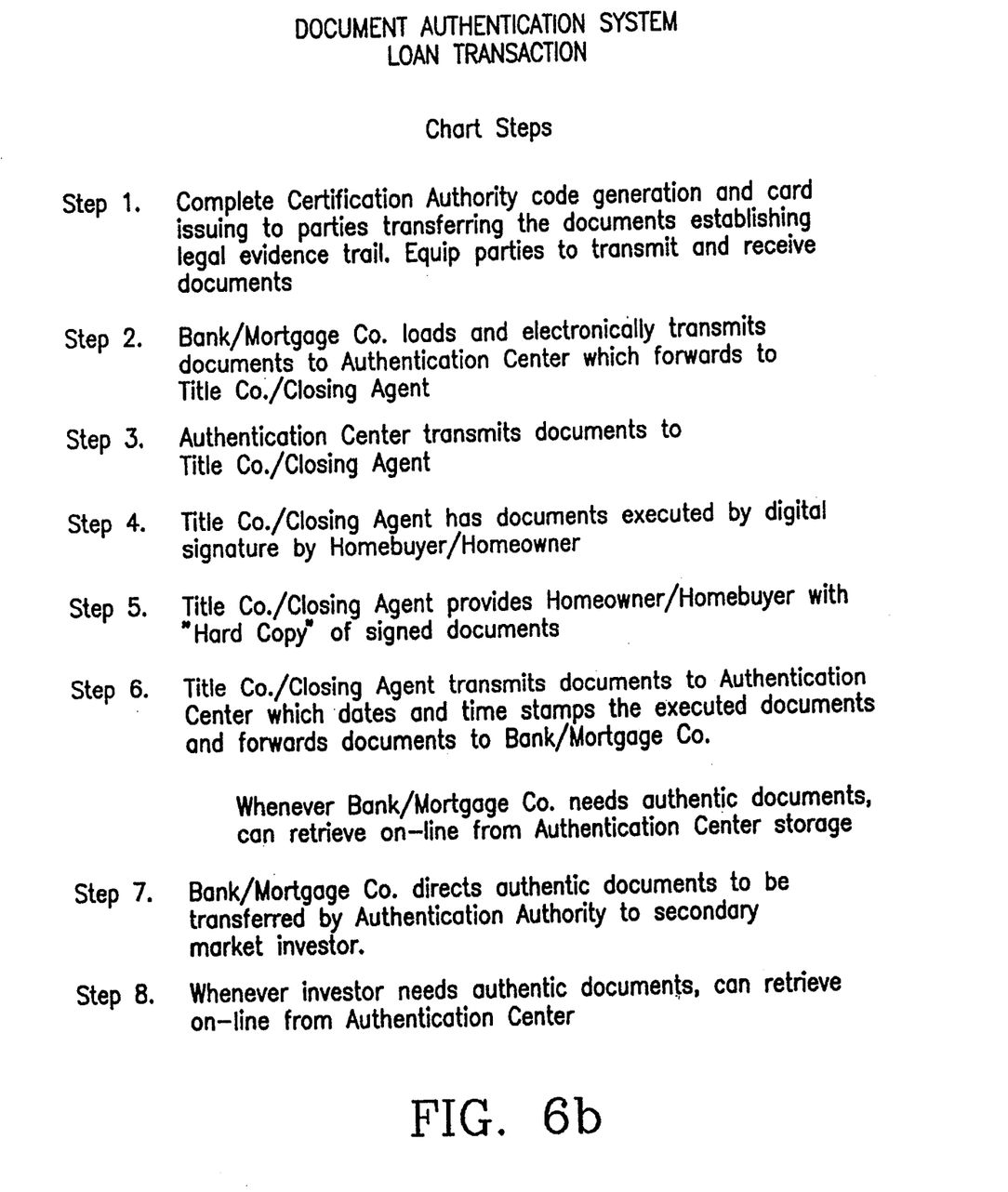

FIGS. 6a, 6b are diagrams illustrating a typical application of the DAS in the mortgage finance industry with a title company/closing agent for the loan as a Transfer Agent. In step 1, the Certification Authority completes code generation and issues PCM/CIA cards to authorized parties for transferring documents and establishing legal evidence trails. The parties, who would generally not be individuals but commercial and financial institutions such as a BANK/Mortgage Co. and a Title Co./Closing Agent, would be equipped to transmit and receive documents electronically. In step 2, a Bank/Mortgage Co. loads and electronically transmits loan documents to the Authentication Center, which forwards them to a Title Co./Closing Agent after adding integrity blocks and date and time stamps. In step 3, the Authentication Center transmits the authenticated loan documents to the Title Co./Closing Agent.

In step 4, the Title Co./Closing Agent has the documents executed by digital signature by a Homebuyer/Homeowner. In step 5, the Title Co./Closing Agent provides Homeowner/Homebuyer with "hard copies" of the signed documents. In step 6, the Title Co./Closing Agent transmits the documents to the Authentication Center, which adds the integrity blocks and dates and time stamps the executed documents, forwards the documents to the Bank/Mortgage Co., and stores the documents. Whenever the Bank/Mortgage Co. needs copies of the authentic documents, they can be retrieved on-line from Authentication Center storage.

In step 7, the Bank/Mortgage Co. directs that the authentic documents be transferred by the Authentication Authority to a secondary-market Mortgage Bank/Investor. In step 8, whenever the Investor needs authentic documents, they can be retrieved on-line from the Authentication Center It will be noted that the present description and drawings are illustrative only and that one of ordinary skill in the art would recognize that various modifications could be made without departing from the spirit or scope of the present invention which is to be limited only by the following claims.

What is claimed is:

1. An authentication system for electronic communication of documents and for ensuring integrity of transmitted documents and non-repudiation of the transmitted documents, comprising:

means for digitally encrypting a document;

means for certifying an identity of a transferor of the document;

means for generating a public key and a private key, at least one of the public key and the private key being used for digitally encrypting the document;

means for signing the document with a digital signature;

means for verifiably transmitting an encrypted, signed document; and means for authenticating a transmitted, encrypted, signed document.

2. The authentication system of claim 1, further comprising means for sealing the encrypted, signed document, wherein the sealing means signs the encrypted, signed document with a second digital signature.

3. An electronic document storage and retrieval system that ensures authenticity of electronic documents stored in the system and transfers of electronic documents to authorized parties, comprising:

means for securely storing digitally encrypted electronic documents;

means for authenticating electronic documents retrieved from storage; and means for verifying authority of a party requesting retrieval of a authenticated electronic document.

4. A method of authenticating electronically communicated documents that ensures integrity of the transmitted documents and non-repudiation of the transmitted documents, comprising the steps of:

digitally encrypting a document;

certifying an identity of a transferor of the document;

generating a public key and a private key, at least one of the public key and the private key being used for digitally encrypting the document;

signing the document with a digital signature;

verifiably transmitting an encrypted, signed document; and authenticating a transmitted, encrypted, signed document.

5. The method of claim 4, wherein the certifying step includes a step of delivering a personal identification number and at least one of the public key and the private key to an originator of the document.

6. The method of claim 4, wherein the authenticating step comprises a step of including an integrity block and a date and time stamp in the transmitted, encrypted, signed document.

* * * * *

UNITED STATES PATENT AND TRADEMARK OFFICE
CERTIFICATE OF CORRECTION

PATENT NO. : 5,615,268

DATED : March 25, 1997

INVENTOR(S) : Bisbee et al.

It is certified that error appears in the above-indentified patent and that said Letters Patent is hereby corrected as shown below:

Column 6, line 64, delete "modem" and insert therefor --modern--.

Signed and Sealed this

Twenty-sixth Day of August, 1997

Attest:

BRUCE LEHMAN

Attesting Officer

Commissioner of Patents and Trademarks